United States Patent [19]

Boisseau

[11] Patent Number: 5,100,284

[45] Date of Patent: Mar. 31, 1992

[54] ROBOT WITH TWO ARMS

[75] Inventor: Jean-Louis Boisseau, Bucheres, France

[73] Assignee: Vega Automation, France

[21] Appl. No.: 591,872

[22] Filed: Oct. 2, 1990

[30] Foreign Application Priority Data

Oct. 2, 1989 [FR] France ................... 89 12836

[51] Int. Cl.⁵ ............................................. B65G 57/04
[52] U.S. Cl. ............................... 414/744.3; 414/744.5; 414/792.9; 414/793; 74/89.22; 901/21; 901/25
[58] Field of Search ............... 414/744.3, 744.5, 744.7, 414/744.8, 736, 737, 799, 673, 792.9, 793; 901/21, 25, 40, 48, 17; 74/89.21, 89.22

[56] References Cited

U.S. PATENT DOCUMENTS

| | | | |
|---|---|---|---|
| 2,956,696 | 10/1960 | Drakengren | 414/792.9 X |
| 3,167,810 | 2/1965 | Soderquist | 414/744.3 X |
| 3,682,331 | 8/1972 | Fetherston | 198/435 X |
| 3,870,164 | 3/1975 | Haase | 414/744.3 |
| 4,229,136 | 10/1980 | Panissidi | 414/673 |
| 4,453,072 | 6/1984 | Middleton, Jr. et al. | 74/89.22 X |
| 4,455,120 | 6/1984 | Richter | 414/719 |
| 4,492,512 | 1/1985 | Mink | 414/744.8 X |
| 4,850,782 | 7/1989 | Focke | 901/48 X |

FOREIGN PATENT DOCUMENTS

| | | |
|---|---|---|
| 0016330 | 10/1980 | European Pat. Off. . |
| 0019596 | 11/1980 | European Pat. Off. . |
| 0058955 | 9/1982 | European Pat. Off. . |
| 0066014 | 12/1982 | European Pat. Off. . |
| 0102217 | 3/1984 | European Pat. Off. . |
| 484723 | 10/1929 | Fed. Rep. of Germany ..... 74/89.22 |
| 3636602 | 6/1987 | Fed. Rep. of Germany . |
| 8807313 | 9/1988 | Fed. Rep. of Germany . |
| 2092747 | 1/1972 | France . |
| 2532578 | 9/1982 | France . |
| 2545406 | 5/1983 | France . |
| 2533284 | 9/1983 | France . |
| 2536690 | 11/1983 | France . |
| 62-34728 | 2/1987 | Japan .................... 901/21 |
| 663576 | 5/1979 | U.S.S.R. .................. 901/21 |
| 2092090 | 8/1982 | United Kingdom . |

OTHER PUBLICATIONS

Jones, W. B. et al., "Cable Drive", IBM Technical Disclosure Bulletin, vol. 2, No. 5, Feb. 1960.

Primary Examiner—Robert J. Spar
Assistant Examiner—William M. Hienz
Attorney, Agent, or Firm—Hill, Van Santen, Steadman & Simpson

[57] ABSTRACT

A robot of a cylindrical structure with vertical axes of rotation comprises a base for support on a ground surface; a column mounted on the support for rotation about an axis; a support element for linking and for driving, which is flexible and inextensible and closed in a loop, mounted on and along the column; a first assembly including a carriage fixed to one of the vertical sections of the element, a horizontal bracket mounted on the carriage for rotation about a second axis, a head mounted on the bracket for rotation about a third axis; a second assembly including a second carriage fixed to the second section of the element, a second bracket, a second head mounted on the second bracket; and a control arrangement for driving and controlling so that the two assemblies are displaced synchronously along the column in opposite vertical directions to one another.

17 Claims, 4 Drawing Sheets

ROBOT WITH TWO ARMS

The invention relates to a robot of cylindrical structure with five main vertical axes of rotation and having two balanced movable arms.

The use of robots or manipulators is currently well-known in numerous industries, in particular that of packaging (this term includes packaging proper but also exterior packaging, finishing, presentation and storage). Robots can be classified according to their main structure as robots of cartesian structure (such as gantry robots), or of cylindrical structure (such as "SCARA" robots), or of polar structure, or of spherical structure. "SCARA" robots have a cylindrical structure and the main rotations are carried out horizontally (hence the vertical axes of rotation), in contrast to the spherical structure in which the three axes of rotation are perpendicular to one another in pairs. Numerous companies offer such robots, in particular the following: ADEPT, DAINICHI, HITACHI, ASEA, COMAU, IBM, KNOSKE & GOSH, KURA, MANUTEC, SONY, BOSCH, STAUBLI, HIRATA. The general state of the art can be illustrated by the following patent documents in particular: EP 0016330, EP 0019596, EP 0058955, FR 2545406, FR 2092 747, DE 88 07313, FR 2536690, GB 2092090, DE 36 36 602 and EP 0102 217.

The document EP 0066014 relates to a manipulator which has two rigid arms which are opposite in a diametrical manner in relation to an axis in relation to which they pivot to 180°. The purpose of such a manipulator is simultaneously to pick up and deposit pieces. However, a manipulator of this type has a quite specific structure which is completely different from that of a robot of the "SCARA" type. In fact, such a "SCARA" robot of cylindrical structure conventionally has three main vertical axes of rotation and comprises a lower base for support on the ground, a vertical column is supported by the base and is mounted on the base for rotation about a first vertical axis, a support element for linking and for driving, which is essentially flexible and inextensible, is closed on itself in a loop, is mounted essentially taut vertically on and along the column by means of upper and lower return elements and is supported by the column, a carriage is fixed to a first of the two vertical sections of the element for support and for driving and is mounted slidably in a vertical direction along the column, a bracket extending essentially horizontally is mounted, by its first end part, on the carriage for rotation about a second vertical axis, a head is mounted on the bracket at its second end part for rotation about a third vertical axis, and elements for driving and for control. Because the bracket is overhanging since it is fixed to the carriage by one of its end parts, the carriage and the element for support and for driving are subject to forces which are all the higher, when a mass which the robot supports by means of its head is greater. It is considered necessary to balance these forces, wholly or partly, and to this end, in "SCARA" robots, a counterweight is conventionally provided, which is situated on that section of the element for support and for driving which is opposite that with which the carriage is associated. The mass of this counterweight is all the greater, the weaker its lever arm is compared to that of the assembly of carriage, bracket and head.

This problem of balancing in robots has already been posed and has also received other technical solutions in other types of robots (see documents FR 2533284 and FR 2532578).

Furthermore, robots—and in particular "SCARA" robots—pose the general problem of rates, or of the speed of functioning. This problem is particularly critical in the packaging industry (in the meaning defined above), given that the rate of the other assemblies or subassemblies of the packaging installations comprising such robots has increased and that the robot threatens to limit the overall rate of the installation.

SUMMARY OF THE INVENTION

It is thus the object of the invention to propose a "SCARA" robot which simultaneously on the one hand provides a new and efficient solution to the problem of balancing and on the other hand has an increased rate of functioning by virtue of a configuration with two balanced movable arms.

The invention also aims to achieve an object without substantially increasing the complexity of the robot.

To this end, the invention proposes a robot of the type mentioned above such as also comprises a second carriage fixed to the second of the two vertical sections of the same element for support and for driving and mounted slidably in a vertical direction along the same column, a second bracket extending essentially horizontally and mounted, by its first end part, on the second carriage for rotation about a fourth vertical axis, a second head mounted on the second bracket, at its second end part, in rotation about a fifth vertical axis, the two assemblies constituted respectively by the first carriage, the first bracket, the first head on the one hand and the second carriage, the second bracket, the second head on the other hand being displaced synchronously in a vertical direction, in opposite directions to one another, towards the top or the bottom respectively, each of these two assemblies balancing or contributing to balancing the other, and the elements for driving and for control ensuring the displacements of the two assemblies in a coordinated manner.

Such a robot is particularly well adapted to applications in the field of packaging as defined above, although these applications are not exclusive. More specifically, such a robot can be integrated into a palletization and/or depalletization installation and more generally into the handling of different products. Moreover, it can be adapted to assembly operations which require the combination of movement of the two arms.

BRIEF DESCRIPTION OF THE DRAWINGS

The other characteristics of the invention will emerge from the following description with reference to the attached drawings, in which.

DESCRIPTION OF THE PREFERRED EMBODIMENTS

Figure 1:
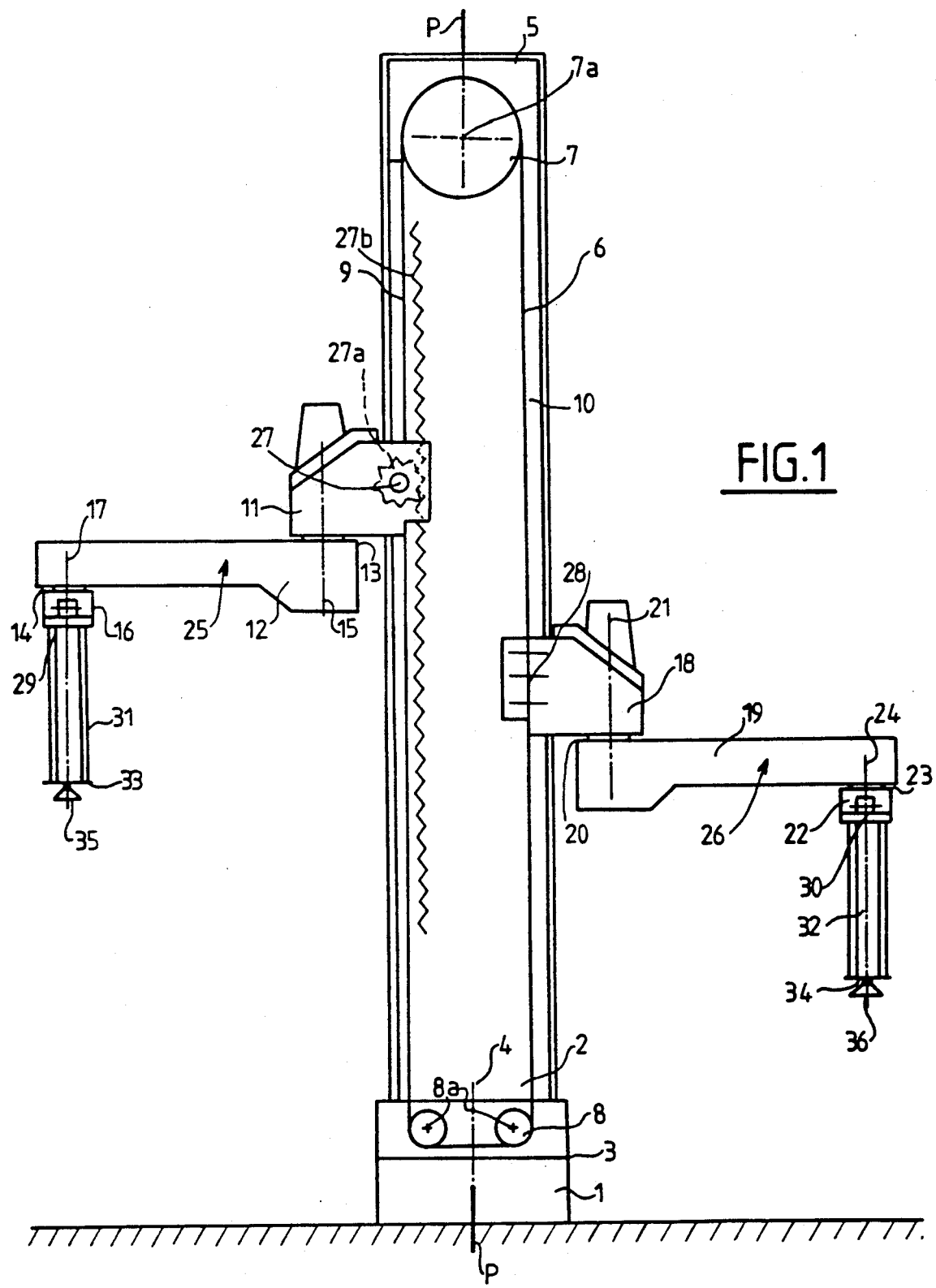
FIG. 1, is a schematic elevational view of a robot according to the invention in one of its possible positions.

The invention relates to a robot of the "SCARA" type of a cylindrical structure with five main vertical axes of rotation and having two balanced movable arms.

Such a robot of the "SCARA" type comprises a lower base 1 for support on the ground, forming a pedestal which can have a contour of a general circular shape. It comprises, secondly, a vertical column 2 supported, by means of its lower end part 3, by the base 1. The column 2 is mounted on the base 1 pivotably or for rotation about a first vertical axis 4. The column 2 extends over a given vertical height between its lower end part 3 and its upper end part 5. This height is that which is necessary for the clearance of the head of the robot in a vertical direction. The column 2 can have a height of the order of 1 to 10 meters for example. The column 2 constitutes a rigid bearing structure which is capable of absorbing the stresses which result from the implementation of the robot. To this end, the column 2 is constituted in an appropriate manner by profiled pieces which can comprise rigidification elements. The column 2, as such, is essentially hollow. The first vertical axis 4 also constitutes the vertical and longitudinal axis of the column 2.

The robot comprises, thirdly, a support element or means 6 for linking and for driving which element has the characteristic of being essentially flexible and inextensible, closed on itself in a loop, mounted essentially taut vertically on/and along the column 2, that is to say in the internal space of the latter, by means of return elements, upper 7 and lower 8 respectively, supported by the column 2. In a typical exemplary embodiment, the support element 6 for linking and for driving is a support band of a constitution and width such that it can absorb the stresses developed by the robot. The return elements 7 and 8 are rollers with horizontal axes 7a and 8a supported by bearings of the column 2. By essentially flexible and inextensible support element 6 for linking and for driving, it is understood that the element 6 can be subjected to stresses of the order of those brought into play during the functioning of the robot. By support element for linking and for driving closed on itself in a loop, it is understood that it can have an initial end and a final end associated with one another in a rigid manner. By support element for linking and for driving mounted essentially taut vertically, it is understood that, between the return elements 7 and 8, the element 6 is taut, without any significant looseness. As has already been indicated, the support element for linking and for driving is essentially positioned in the internal space of the column 2, which is hollow to this end. The support element for linking and for driving is divided into two sections, each extending vertically between the return elements 7, 8. These two sections 9, 10 are parallel and opposite to one another. It is understood that, in place of support bands, endless chains, endless cables, or other equivalent elements can be used as support element for linking and for driving.

In the representation shown (FIG. 1), the driving of the carriage 11 is brought about by a pinion 27a of the carriage 11, which pinion has a horizontal axis 27, is motorized and engages on a rack 27b which is mounted fixed vertically on and in the column 2, the band 6 being jointed in the region of the frame of the carriage 11. In an alternative, the rack is made motive and, to this end, it is deformable. In another method of driving, at least one of the return elements 7, 8 is motorized so as to be driven and to ensure the displacement of the element 6 for support and for driving, the two sections 9 and 10 being displaced synchronously and in two opposite directions, one sliding towards the top whereas the other slides towards the bottom and vice versa.

The robot comprises, fourthly, the carriage 11 which is fixed to one of the two sections of the element 6 for support and for driving. This first carriage 11 is, for example, fixed to the first section 9. Such a carriage 11 has a given spatial requirement in a vertical direction, in a horizontal direction parallel to the axes 7a and 8a and in a horizontal direction perpendicularly to a first vertical mid-plane P of the robot, which is defined by the axes 7a and 4 and extends perpendicular to the plane of FIG. 1. In order to ensure an appropriate retention of the carriage 11 on the support element for linking and for driving, a number of fixings can be provided, staggered along the element 6. This fixing is preferably removable. It is made by means of bolts, for example. In order to permit the mounting of the carriage 11, the column 2 has an opening extending longitudinally between the two end parts 3, 5. The carriage 11 passes through this opening. If necessary, guide elements for the carriage 11 are provided in the column 2, which interact with complementary elements of the carriage. For example, in the internal space of the column 2, vertical rails can be provided, on which rollers with horizontal axes roll, which are supported by the carriage 11. In an alternative, the guidance is ensured exclusively by the support element 6 for linking and for driving. Given the mounting of the carriage 11 on the support element for linking and for driving, the carriage 11 is thus mounted slidably in a vertical direction along the column 2.

The robot comprises, fifthly, a first bracket 12 which extends essentially horizontally and comprises two end parts, inner 13 and outer 14 respectively. The first bracket 12 is mounted on the first carriage 11 by its inner end part 13, so as to be able to pivot or rotate about a second vertical axis 15.

The robot comprises, sixthly, a first head 16 mounted on the first bracket 12 at its outer end part 14, so as to be able to pivot or rotate about a third vertical axis 17.

The first bracket 12 is constituted by a rigid piece which is capable of absorbing the stresses transmitted between the first head 16 and the first carriage 11 during the implementation of the robot. The first head 16 is arranged so as to be able to receive the appropriate functional elements, as will be seen subsequently.

The robot comprises, seventhly, elements for driving and for control which are not specifically represented and make it possible to make the column 2 pivot on the base 1 about the first axis 4, to drive the support element 6 for linking and for driving, the return elements 7, 8 pivoting about their axes 7a, 8a, and/or the pinion 27a respectively, to make the first bracket 12 pivot in relation to the first carriage 11 about the second axis 15, and, lastly, to make the first head 16 pivot in relation to the first bracket 12 about the third axis 17. These elements for driving and for control comprise motors, geared motors, transmissions, servo-systems, programmable automatic systems, numerical control etc. The first bracket 12 is of a length (in a horizontal direction) which is adapted to the distance which has to be travelled by the head 16 in a horizontal direction.

According to the invention, the robot also comprises a second carriage 18, which is fixed at 28 to the section 10 of the same support element 6 for linking and for driving. This second carriage 18 is mounted slidably in a vertical direction along the same column 2. A second bracket 19, which also extends essentially horizontally, is mounted by its inner end part 20 on the second carriage 18 to pivot or rotate about a fourth vertical axis 21. A second head 22 is mounted on the second bracket 19 at its outer end part 23 to rotate or pivot about a fifth vertical axis 24.

The robot thus comprises two movable assemblies 25, 26, the first of which is constituted by the first carriage 11, the first bracket 12 and the first head 16 with the pivoting axes 15 and 17, and the second respectively by the second carriage 18, the second bracket 19 and the second head 22 with the respective pivoting axes 21, 24. These two assemblies are supported by the same base 1, the same column 2 and set in operation the same support element 6 for linking and for driving which also ensures their linking. The elements for driving and for control are also partly common. In movement, the two assemblies 25, 26 are displaced in a vertical direction synchronously but in opposite directions to one another, towards the top or the bottom respectively by the element 6.

According to the invention, each of the assemblies 25, 26 balances or contributes to balancing the other. As a result of this, the robot need, on at least one and generally on both the sections 9, 10 of the support element for linking and for driving, have no counterweight which has exclusively this function as is known in robots of the "SCARA" type currently known.

The elements for driving and for control ensure the displacements of the two assemblies 25, 26 in a coordinated manner. The two assemblies 25, 26 are preferably essentially similar and, in particular, the brackets 12, 19 are preferably of the same length and the heads 16, 22 are arranged to receive the same functional elements. Each of the carriages 11, 18 are displaced in a second vertical mid-plane of sliding which extends along the axis 4 and is perpendicular to the plane P and lies in the plane of FIG. 1. According to the invention, these two second vertical mid-planes of sliding of the two carriages are essentially merged into a single plane. As can be seen from the figures (in particular FIGS. 3 and 4), the two carriages 11, 18 are fixed to the respective sections 9, 10 of the support element 6 for linking and for driving by being positioned so as to be capable of being situated essentially one facing the other in the median position of the sections in a vertical direction, or, which amounts to the same thing (see FIG. 5), one of the carriages 11, 18 is situated towards the lower part 3 of the column 2 whereas the other is situated, at the same time, at the upper part 5.

Preferably, at least one of the two carriages 11, 18, possibly both the carriages, is mounted, in an adjustable manner slidably in a vertical direction, on the corresponding section 9, 10 of the support element 6 for linking and for driving, so as to allow adjustments which may be rendered necessary.

Possibly, at least one of the two carriages 11, 18, and generally both, is mounted on the corresponding section 9, 10 of the support element 6 for linking and for driving and includes a horizontal axis 27. The pinion 27a, when provided, is mounted on the axis 27 and is made motive by means of a motor or a geared motor and an appropriate electrical connection (sliding or flexible). In the case in FIG. 1, the driving of the carriage 11 is brought about by means of the pinion 27a and the rack 27b as described—thus constituting a driving assembly—and this driving is transmitted to the carriage 18 by the element 6 which ensures the linking with the carriage 18, the assembly comprising the carriage 18 being driven.

In a possible application, to at least one of the two heads 16, 22, and generally to both the heads, a pole 31, 32 is fixed by its upper end part 29, 30, which pole extends essentially vertically and supports, at its lower end part 33, 34, gripping means 35, 36 which can be in an active or inactive state. The functioning of such gripping means 35, 36 can be controlled by the elements for control and for driving of the robot. A robot constituted thus advantageously allows the manipulation of objects and this by virtue of the gripping means 35, 36.

The gripping means 35, 36 are, for example, suction means which are capable of allowing the gripping of crates, bags, elementary containers, packaging formats or objects constituting a unitary whole with an upper surface, and this from above. These suction means can be suction nozzles or boxes. In an alternative, these gripping means are constituted by pincers or fingers or other gripping elements controlled electrically, pneumatically or mechanically.

The invention also relates, by way of application of such a robot, to an installation for packaging, for exterior packaging, for finishing, for presentation, for storage of contents, in particular for elementary containers, in or on containers or supports, in particular crates or pallets, comprising at least one robot such as has just been described, at least one contents feed, at least one container or support feed, at least one discharge for contents, containers or supports, and at least one station for packaging, for exterior packaging, for finishing, for presentation, for storage, for the association of the contents, containers or supports. In such an installation, the robot which has just been described allows the manipulation of the contents, containers or supports.

More specifically, the invention relates to an installation for palletization and/or depalletization (FIGS. 2 to 6) of elementary containers 37, in particular crates or bags, into or out of a container or batch 37a on a pallet 38. The concept of palletization and of depalletization as envisaged here must be considered in the broad sense. Such an installation comprises feed and discharge means for the elementary containers and for the pallets as well as a manipulation robot, such as has just been described, for the elementary containers.

The invention also relates to the operations of loading/unloading of products, and of assembly of products with a number of components.

Figure 2:
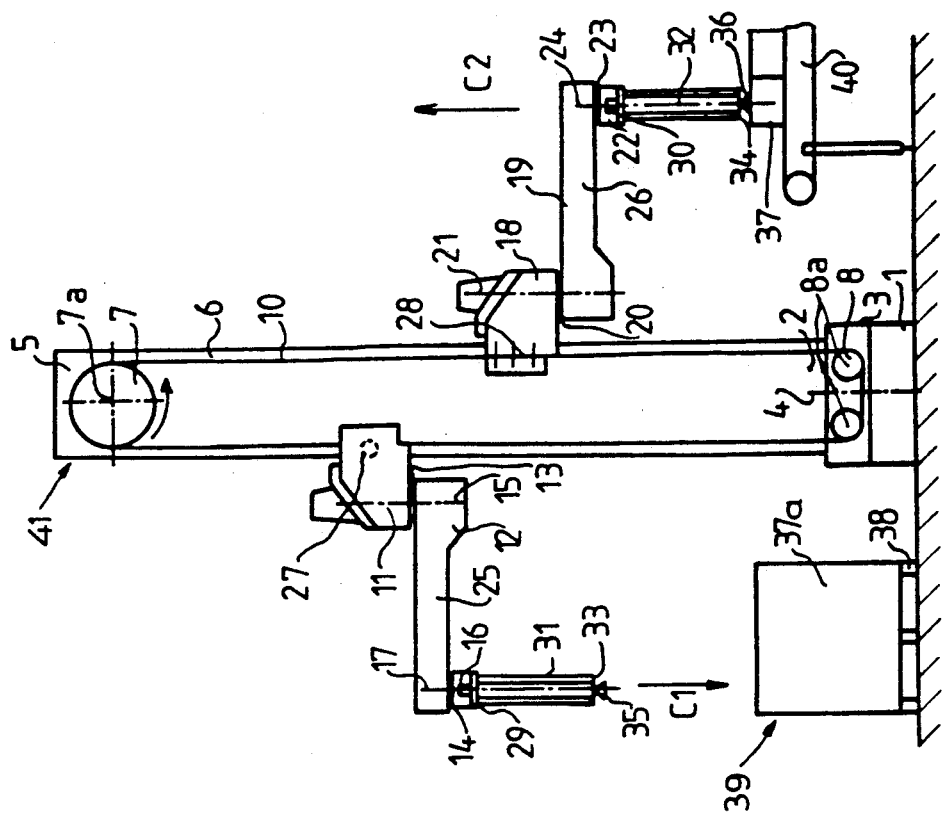
FIGS. 2, 3, 4, 5 are four schematic views, similar to FIG. 1 and illustrating a possible method of functioning of such a robot according to the invention in a possible application.
Figure 3:
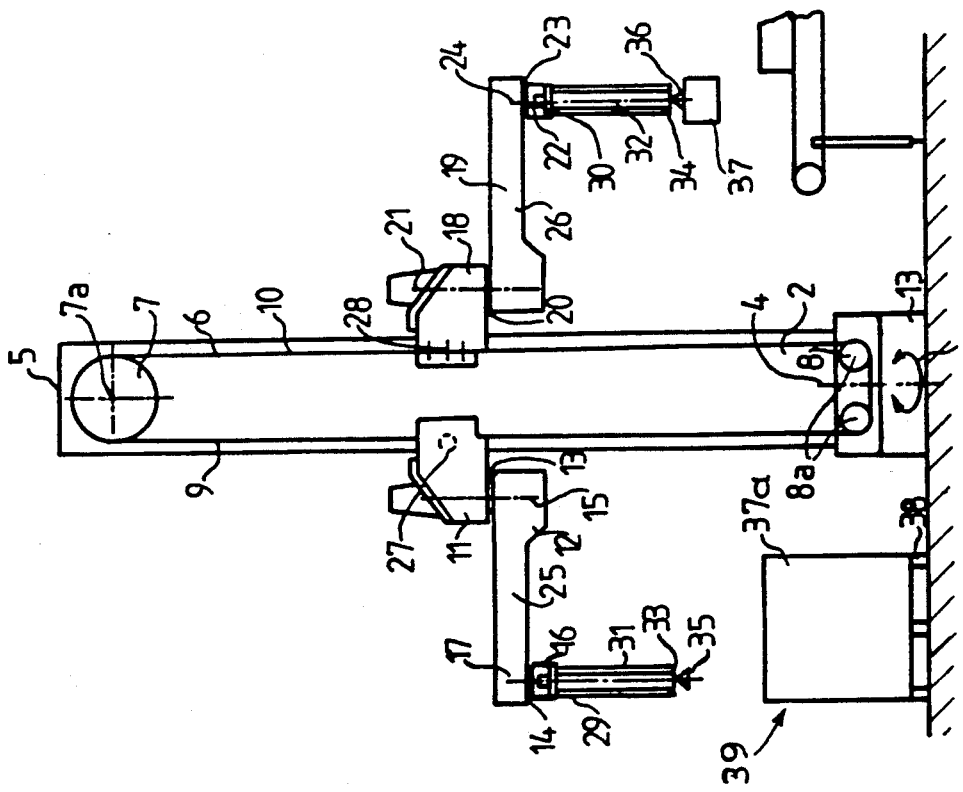
Figure 4:
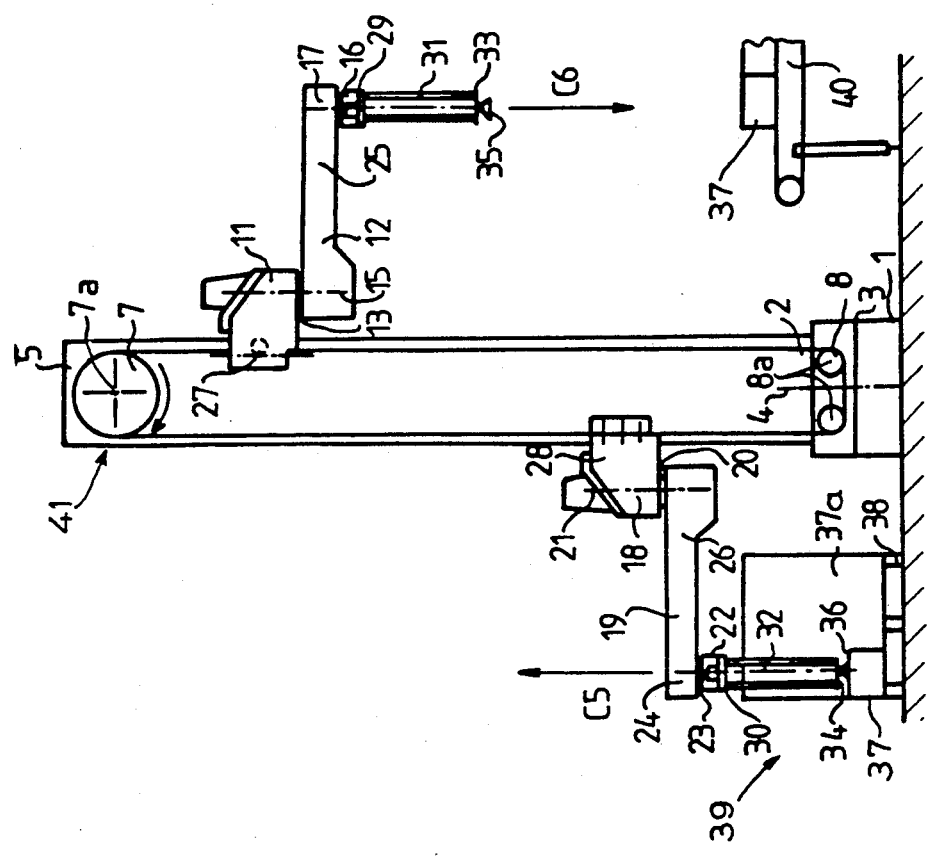
Figure 5:
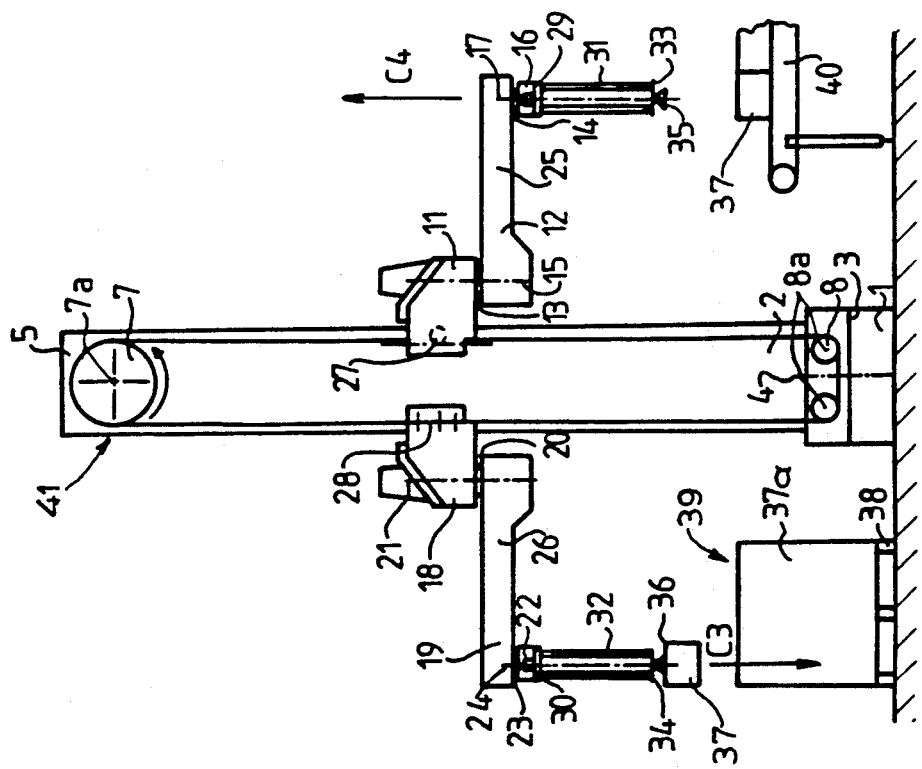

Referring now to FIGS. 2 to 5, which represent a possible embodiment of such an installation, which comprises a single palletization/depalletization station 39, a single conveyor 40 for elementary containers 37 and a robot 41 positioned between these two in such a manner that the two heads can be situated simultaneously in line with the palletization/depalletization station 39 and in line with the conveyor 40. In such a case, the column 2 of the robot is controlled pivotably between two end positions which are essentially at 180° from one another. One of these two positions is represented in FIGS. 2 and 3 and the other in FIGS. 4 and 5.

For the implementation of such an installation, one head 16 is brought in line with the palletization/depalletization station 39 or with the conveyor 40, in a first end position of the column 2. The elements for driving and for control are brought into play in order to lower this same head 16 and to allow its appropriate functional association with the appropriate elementary container 37 of the palletization/depalletization station 39 or of the conveyor 40. The elements for driving and for control are brought into play in order to raise this same head 16 and to free it from the palletization/depalletization station 39 or from the conveyor 40. This head 16 is brought in line with the conveyor 40 or with the palletization/depalletization station 39 respectively in a second end position of the column 2. The elements for driving and for control are brought into play in order to lower this same head 16 and to allow its appropriate functional association with the appropriate elementary container 37 of the conveyor 40 or the palletization/depalletization station 39. The means for driving and for control are brought into play in order to raise this same head 16 and this until the other head is brought to be associated functionally with another appropriate elementary container 37 of the palletization/depalletization station 39 or of the conveyor 40.

Referring now to the case of a palletization installation such as is represented in FIGS. 2 to 5, the functioning cycle is as follows: the second or other head 22 comes to grip an elementary container 37 on the conveyor 40 and, to this end, it is lowered in order that its suction means 36 can come onto the elementary container 37. The first head 16 is then in an upper position and its suction means 35 are in the inactive state. The suction means 36 are brought into play and come to grip the elementary container 37. Subsequently, the support element 6 for linking and driving is brought into play so as to displace towards the top the second head 22 which takes with it the elementary container 37 carried by the means of suction 36. Simultaneously, the first head 16 is displaced vertically and towards the bottom. These movements, which are synchronous and in opposite directions, of the two heads 16, 22 are represented in FIG. 2 by the arrows C1 and C2. The movement is continued until the two assemblies 25, 26 are situated essentially at the same horizontal level. In this situation (FIG. 3), the column 2 is made to pivot by 180° about the axis 4, this pivoting being illustrated in FIG. 3 by the arrow R. The second head 22, which was previously directly above the conveyor 40 then comes to be directly above the palletization station 39. Conversely, the first head 16 which was previously directly above the palletization station 39 comes to be positioned directly above the conveyor 40. It is then possible to drive the support element 6 for linking and for driving in such a manner that the second head 22 is displaced vertically and towards the bottom (arrow C3 in FIG. 4). This movement takes place until the elementary container 37 is positioned in an appropriate manner on the pallet 38. The gripping means 36, which until then had remained in the active state, are controlled in order to pass into the inactive state and release the container 37 previously gripped. In this situation, the gripping means 35 are still in the inactive state. The movement of descending vertical sliding of the second head 22 results in an ascending vertical movement of the first head 22, which is illustrated by the arrow C4 in FIG. 4. When the elementary container 37 is deposited on the pallet 38, the first carriage 11 is positioned on the column 2, rather towards the top. Starting from this situation (FIG. 5), the support element 6 for linking and for driving is controlled in order to cause simultaneously an ascending sliding movement of the second head 22 (arrow C5) and a descending sliding movement of the first head 16 (arrow C6) and this over more than half the possible travel until the first head 16 with the means of suction 35 which is still in the inactive state, comes to pick up a new elementary container situated on the conveyor 40. The cycle can then begin again.

Figure 6:
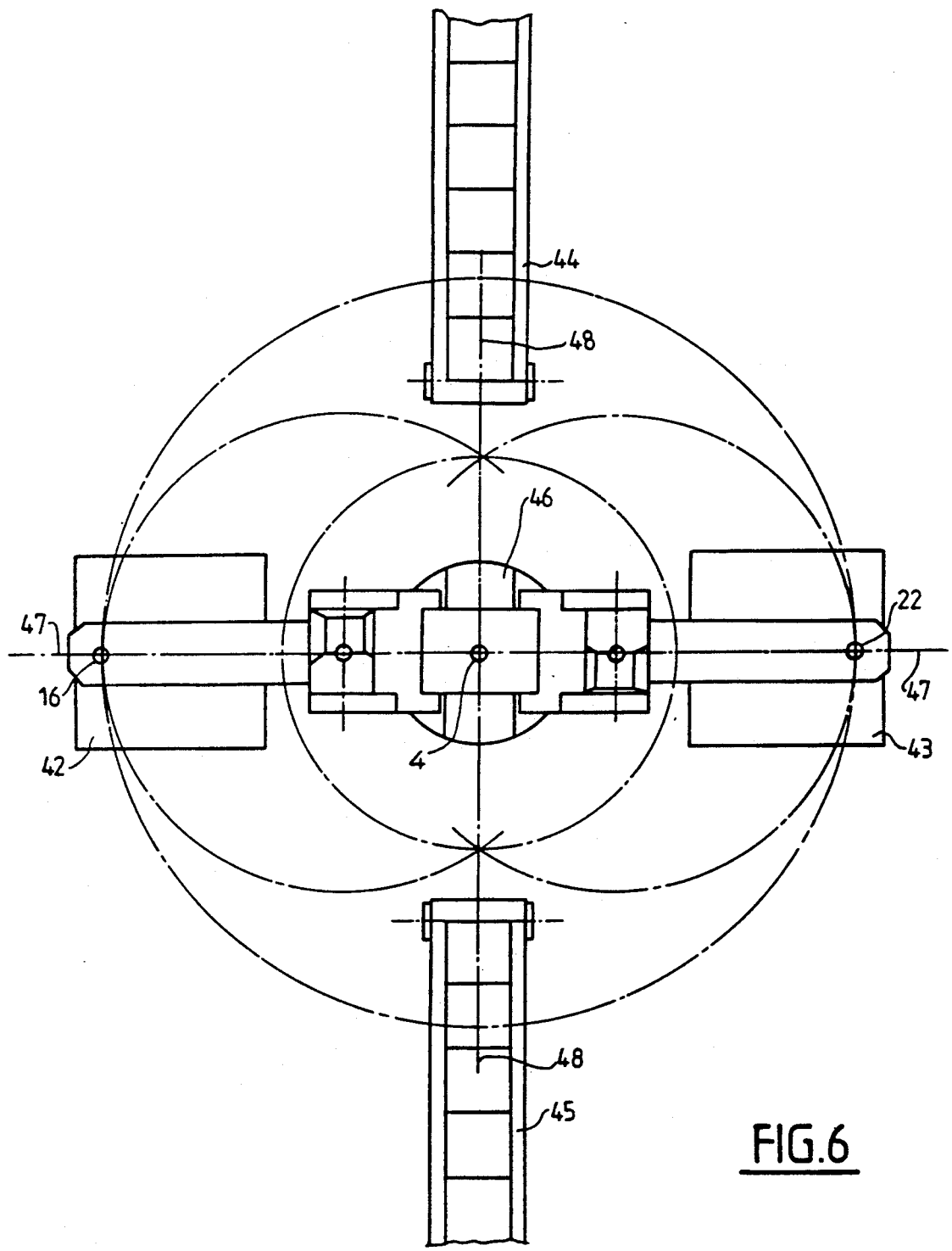
FIG. 6 is a top plan view of the robot according to the invention in another possible application.

Referring now to FIG. 6 which shows another possible alternative embodiment of a palletization/depalletization installation which comprises two palletization/depalletization stations 42, 43 opposite one another, two conveyors 44, 45, also opposite one another, for elementary containers and a manipulation robot 46 positioned between them in such a manner that the two heads 16, 22 of the robot 46 can simultaneously be situated in line with the two palletization/depalletization stations 42, 43 or in line with the two conveyors 44, 45. In particular, the two palletization/depalletization stations 42, 43 extend along an axis 47 perpendicular to the axis 48 on which the two conveyors 44, 45 are positioned. In such a situation, the robot 46 functions with its column 2 pivoting 90° about the axis 4.

I claim:

1. A robot of a cylindrical structure, said robot comprising a lower base for support on a ground surface, a vertical column being mounted on the base for rotation about a first vertical axis, support means for linking and for driving, which is essentially flexible and inextensible, said support means being closed on itself in a loop, being mounted essentially taut vertically on and along the column by upper and lower return elements supported by the column to form two vertical sections, a first carriage being fixed to a first of the two vertical sections of the support means and being mounted for slidable movement in a vertical direction along the column, a first bracket having a first end and a second end, said bracket being mounted at the first end on the carriage for rotation about a second vertical axis and to extend essentially horizontal from the carriage, a first head being mounted on the second end of the bracket for rotation about a third vertical axis, a second carriage being fixed to a second of the two vertical sections of the support means and being mounted for slidable movement in a vertical direction along the column, a second bracket having a first and a second end, said second bracket being mounted at the first end on the second carriage for rotation about a fourth vertical axis and to extend essentially horizontally therefrom, a second head being mounted on the second end of the second bracket for rotation about a fifth vertical axis, the first carriage, the first bracket and the first head forming a first assembly, the second carriage, the second bracket and the second head forming a second assembly, said first and second assemblies being displaced synchronously in opposite vertical directions to one another, towards the top or bottom of the column, respectively, each of these two assemblies contributing to balancing the other, and control means for driving and for controlling the displacements of the two assemblies in a coordinated manner.

2. A robot according to claim 1, wherein at least one of the sections of the support means is free of any counterweight which has exclusively a counterweight function.

3. A robot according to claim 1, wherein the bracket and head of each of the two assemblies are essentially similar to each other.

4. A robot according to claim 1, wherein the two carriages slide in the same vertical plane.

5. A robot according to claim 1, wherein the two carriages lie in substantially the same horizontal plane when in a vertical median position.

6. A robot according to claim 1, wherein at least one of the two carriages is mounted, in an adjustable manner slidably in a vertical direction, on the corresponding section of the support means.

7. A robot according to claim 1, wherein at least one of the two carriages supports a pinion for rotation about a horizontal axis.

8. A robot according to claim 1, wherein each of the two heads has a separate pole with the pole being fixed to the head by an upper end part to extend essentially vertically, the pole having a lower end part supporting a gripping means which can be selectively placed in an active or inactive state by the control means so that the robot is a robot for manipulating objects.

9. A robot according to claim 8, wherein the gripping means are suction means which are capable of allowing, in particular, the gripping of crates, bags, containers, packaging formats or objects constituting a unitary whole with an upper surface, from above.

10. A robot according to claim 1, wherein one of the two carriages forms part of a driving assembly whereas the other of the two carriages is driven by virtue of the support means.

11. A robot according to claim 10, wherein said one carriage forming a part of the driving assembly is driven by means of a pinion which interacts with a rack with one of the rack and pinion being moved.

12. A robot according to claim 1, wherein the support means is motor driven.

13. An installation for palletization and/or depalletization of elementary containers, in particular crates or bags, onto and/or from a pallet, said installation comprising feed and discharge means for the elementary containers, a station for the pallets and at least one manipulation robot for transferring the elementary containers between the pallet and feed and discharge means, said manipulation robot comprising a robot of a cylindrical structure having a lower base for support on a ground surface, a vertical column being mounted on the base for rotation about a first vertical axis, support means for linking and for driving, said support means being essentially flexible and inextensible, being closed on itself in a loop and being mounted essentially taut vertically on and along the column by upper and lower return elements supported by the column, a first assembly including a first carriage, a first bracket and a first head, said first carriage being fixed to a first of two vertical sections of the support means and being mounted for slidable movement in a vertical direction along one side of said column, said first bracket having a first end and a second end, said first bracket being mounted at the first end of the first carriage for rotation about a second vertical axis and to extend substantially horizontally therefrom, said first head being mounted on the second end for rotation about a third vertical axis, a first suction means for selectively gripping elementary containers being attached to said first head, a second assembly including a second carriage, a second bracket and a second head having a second suction means for selectively engaging elementary containers being attached thereto, said second carriage being fixed to a second of the two vertical sections and being mounted for slidable movement in a vertical direction along a second side of said column, said second bracket having a first end and a second end, said second bracket being mounted by the first end on the second carriage for rotation about a fourth vertical axis and to extend substantially horizontally therefrom, said second head being mounted on the second end of the second bracket for rotation around a fifth vertical axis, said first and second assemblies being displaced synchronously in opposite vertical directions to one another toward the top or bottom of the column, respectively, each of these two assemblies contributing to balancing the other, and control means for driving and controlling to ensure the displacement of the two assemblies in a coordinated manner, said control means individually controlling the operation of each of the suction means to pick up and release containers.

14. An installation according to claim 13, wherein said feed and discharge means includes a conveyor, said robot being positioned between the station and conveyor so that the two heads are simultaneously situated in line with the station and conveyor.

15. An installation according to claim 14, wherein said control means rotates the column between two end positions which are essentially at 180° from each other.

16. An installation according to claim 13, which includes a second station opposite the first-mentioned station, a second conveyor opposite a first conveyor of the feed and discharge means, said robot being positioned between the two conveyors and two stations so that by rotating the column, the two heads of the robot can be moved from a position aligned with two stations to another position aligned with the two conveyors.

17. A robot according to claim 8, wherein the robot is part of an installation for palletization and/or depalletization of containers and includes a station for pallets and a station having a conveyor.

* * * * *